US009773131B2

(12) United States Patent
Matsumoto et al.

(10) Patent No.: US 9,773,131 B2
(45) Date of Patent: *Sep. 26, 2017

(54) INFORMATION PROCESSING DEVICE AND PORTABLE SETTLEMENT TERMINAL DEVICE

(71) Applicant: PANASONIC INTELLECTUAL PROPERTY MANAGEMENT CO., LTD., Osaka (JP)

(72) Inventors: Manabu Matsumoto, Fukuoka (JP); Kazuki Saitoh, Fukuoka (JP); Takeshi Ninomiya, Hyogo (JP); Yoshihide Nakashima, Fukuoka (JP); Seiro Shimoda, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,290

(22) Filed: Dec. 19, 2016

(65) Prior Publication Data
US 2017/0098104 A1 Apr. 6, 2017

Related U.S. Application Data

(63) Continuation of application No. 14/706,135, filed on May 7, 2015, now Pat. No. 9,607,181.

(30) Foreign Application Priority Data

May 8, 2014 (JP) .................. 2014-096904

(51) Int. Cl.
*H04L 29/06* (2006.01)
*G06F 21/86* (2013.01)
(Continued)

(52) U.S. Cl.
CPC .............. *G06F 21/86* (2013.01); *G06F 21/36* (2013.01); *G06F 21/74* (2013.01); *G06F 21/83* (2013.01); G06Q 20/3227; G06Q 20/4012; G07F 7/0886; G07F 7/1033

USPC .......................................... 726/34
See application file for complete search history.

(58) Field of Classification Search
CPC .......... G06F 21/86; G06F 21/36; G06F 21/74; G06F 21/83; G06F 21/84; G06Q 20/3223;
(Continued)

(56) References Cited

U.S. PATENT DOCUMENTS 5,970,146 A 10/1999 McCall et al.
7,047,559 B2 * 5/2006 Ohmori .................. G06Q 20/02
726/3
(Continued)

FOREIGN PATENT DOCUMENTS

JP 2001-256409 9/2001
JP 2003-157239 5/2003
(Continued)

OTHER PUBLICATIONS

The Extended European Search Report (EESR) from European Patent Office (EPO) dated Oct. 12, 2015 in European Patent Application No. 15165552.9.

*Primary Examiner* — Michael S McNally
(74) *Attorney, Agent, or Firm* — Greenblum & Bernstein, P.L.C.

(57) ABSTRACT

An information processing device includes a non-secure information processor and a secure information processor that are each accommodated in a housing. A first input display and a second input display are each provided on an operational surface of the housing. A boundary is between a first end side of the housing and a second end side of the housing, with the second end side of the housing being opposite to the first end side of the housing across the first input display and the second input display. A color or a surface treatment of a first portion of the first end side of the housing corresponding to the non-secure information processor is distinguishable from a color or a surface treatment
(Continued)

of a second portion of the second end side of the housing corresponding to the secure information processor.

11 Claims, 11 Drawing Sheets

(51) Int. Cl.
   *G06F 21/36* (2013.01)
   *G06F 21/74* (2013.01)
   *G06F 21/83* (2013.01)
   *G06F 21/84* (2013.01)
   *G06Q 20/32* (2012.01)
   *G06Q 20/40* (2012.01)
   *G07F 7/08* (2006.01)
   *G07F 7/10* (2006.01)

(52) U.S. Cl.
   CPC ......... *G06F 21/84* (2013.01); *G06Q 20/3223* (2013.01); *G06Q 20/3227* (2013.01); *G06Q 20/4012* (2013.01); *G07F 7/0886* (2013.01); *G07F 7/1033* (2013.01)

(56) References Cited

U.S. PATENT DOCUMENTS

| | | | |
|---|---|---|---|
| 2004/0024710 A1 | 2/2004 | Fernando et al. | |
| 2004/0167820 A1 | 8/2004 | Melick et al. | |
| 2005/0222958 A1 | 10/2005 | Hasegawa et al. | |
| 2008/0209212 A1* | 8/2008 | Ditzman | G06F 21/83 713/167 |
| 2009/0106563 A1* | 4/2009 | Cherpantier | G06F 21/86 713/194 |
| 2009/0243872 A1 | 10/2009 | Takahashi | |
| 2009/0254986 A1* | 10/2009 | Harris | G06F 21/74 726/17 |
| 2010/0024020 A1* | 1/2010 | Baugher | G06F 21/6245 726/7 |
| 2010/0145854 A1* | 6/2010 | Messerges | G06Q 20/32 705/44 |
| 2010/0263031 A1* | 10/2010 | Tsuchiya | G06F 21/32 726/7 |
| 2011/0138464 A1 | 6/2011 | Ohta et al. | |
| 2012/0062443 A1* | 3/2012 | Baldischweiler | G02F 1/1347 345/1.3 |
| 2013/0191925 A1 | 7/2013 | Ditzman et al. | |
| 2014/0041050 A1* | 2/2014 | Heider | G06F 21/84 726/27 |
| 2014/0164252 A1 | 6/2014 | Chai et al. | |
| 2015/0161601 A1 | 6/2015 | Matsumoto et al. | |

FOREIGN PATENT DOCUMENTS

| | | |
|---|---|---|
| JP | 2004-355211 | 12/2004 |
| JP | 2005-293058 | 10/2005 |
| JP | 2006-195599 | 7/2006 |
| JP | 2008-244992 | 10/2008 |
| JP | 2009-245139 | 10/2009 |
| JP | 2011-095840 | 5/2011 |
| JP | 2011-138477 | 7/2011 |
| JP | 2012-185544 | 9/2012 |
| JP | 2014-514669 | 6/2014 |
| WO | 2008/106400 | 9/2008 |
| WO | 2012/149907 | 11/2012 |

* cited by examiner

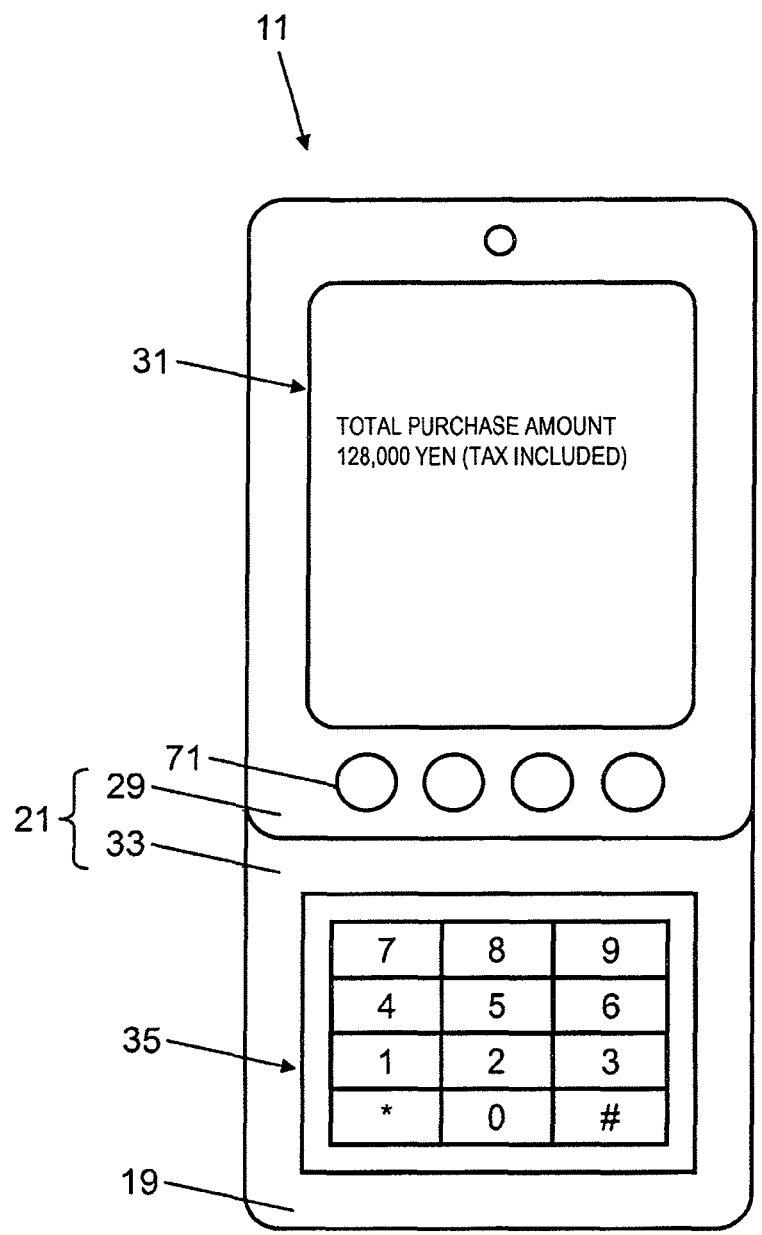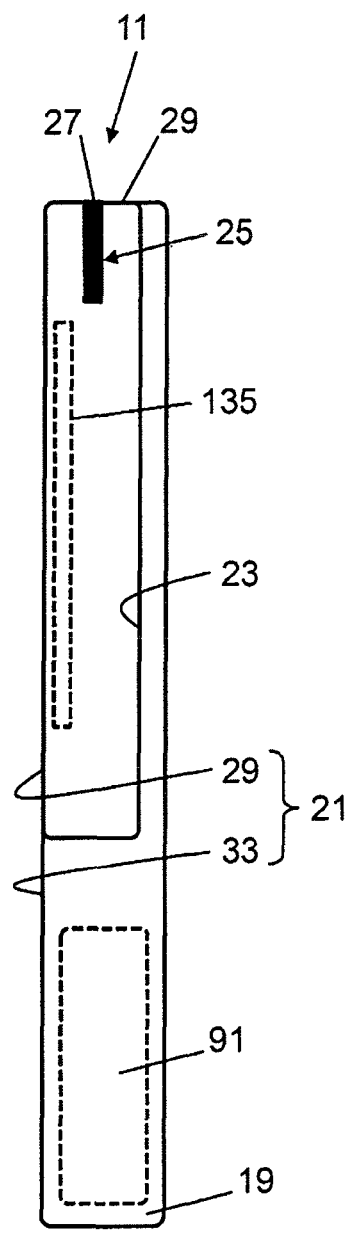

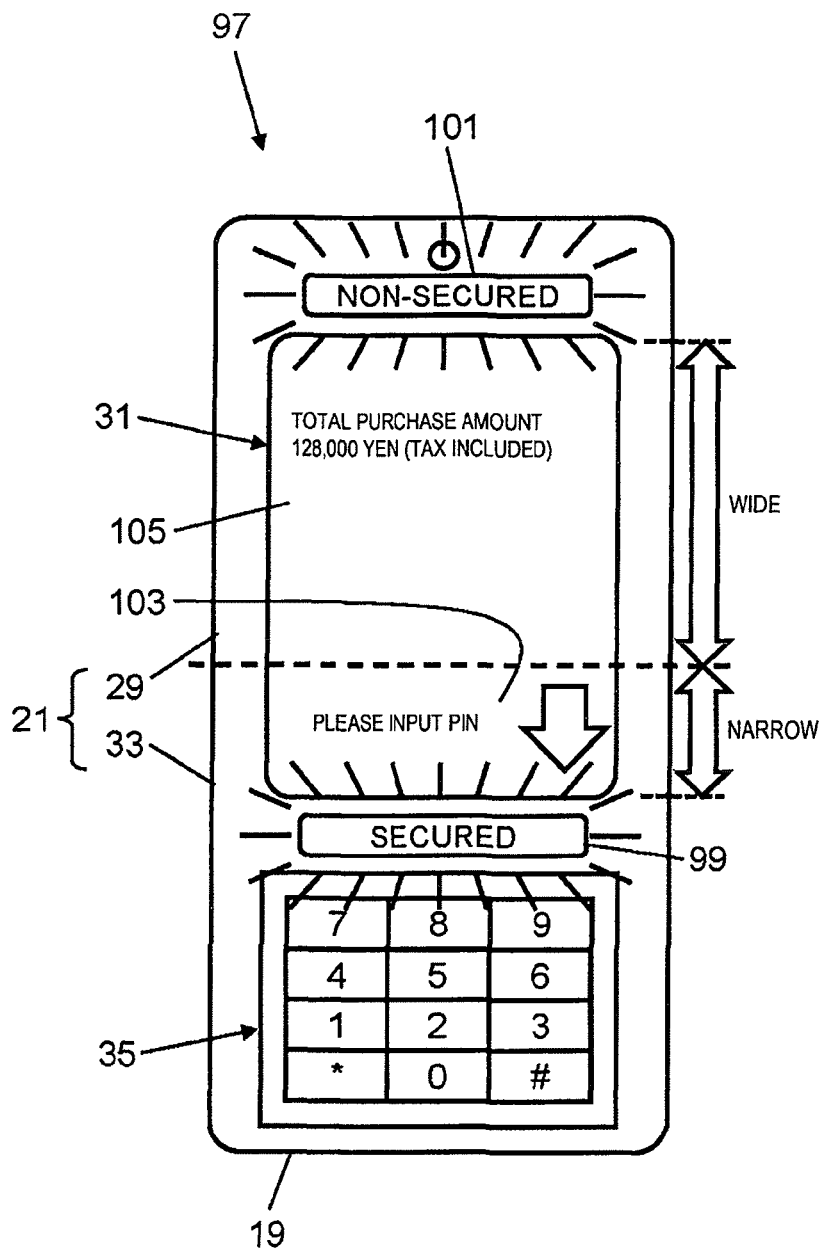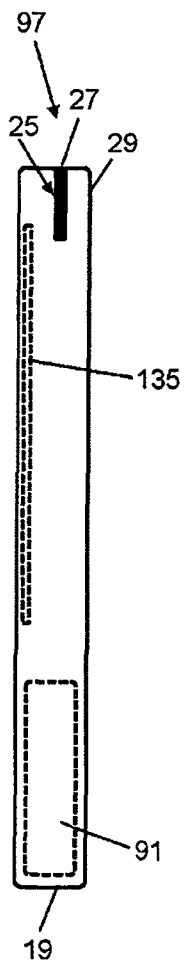

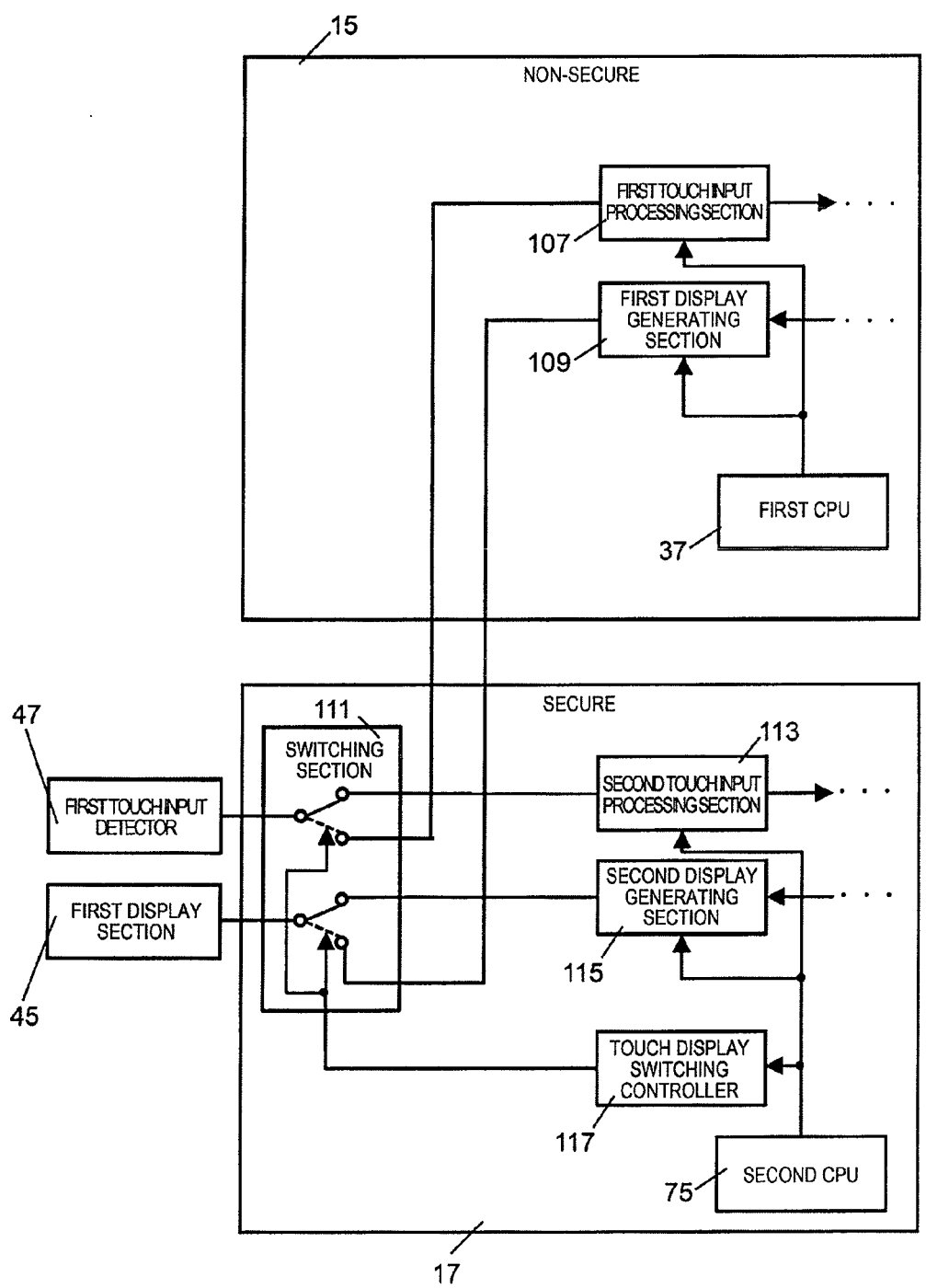

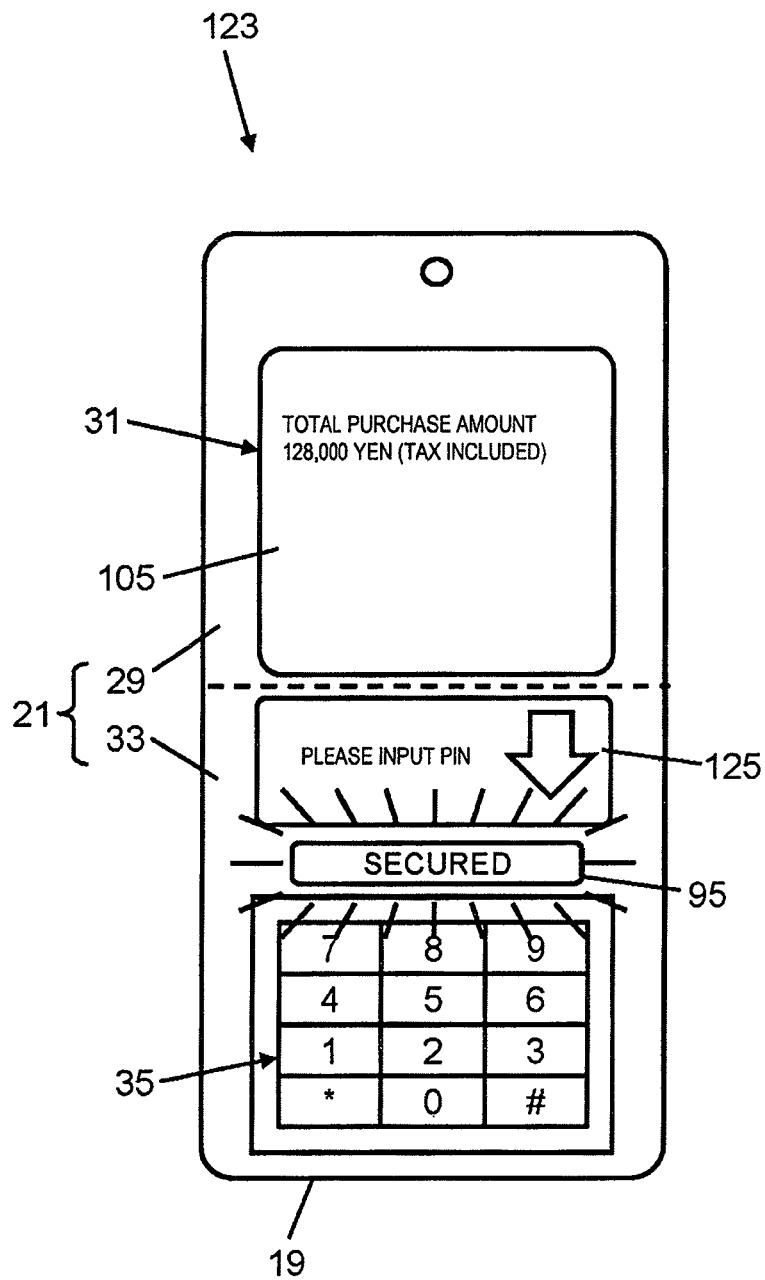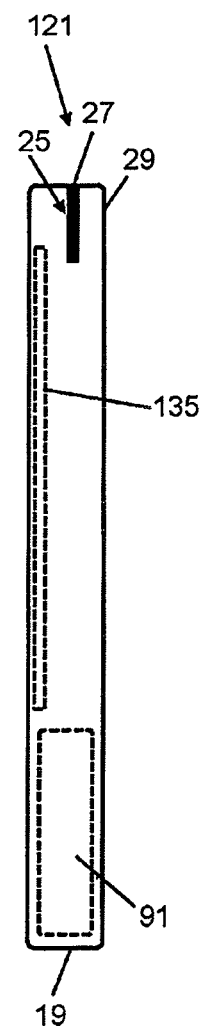

INFORMATION PROCESSING DEVICE AND PORTABLE SETTLEMENT TERMINAL DEVICE

CROSS REFERENCE TO RELATED APPLICATIONS

This is a continuation application of U.S. patent application Ser. No. 14/706,135, filed May 7, 2015, which claims the benefit of Japanese Application No. 2014-096904, filed on May 8, 2014. The entire disclosure of each of the above-identified applications, including the specification, drawings, and claims, is incorporated herein by reference in its entirety.

BACKGROUND OF THE INVENTION

1. Field of the Invention

The present invention relates to an information processing device and a portable settlement terminal device used for performing a procedure of settlement processing in a transaction.

2. Description of the Related Art

For example, in a (credit) transaction of goods or services using a credit card, security of the transaction is secured by checking (identity verification) whether a person who performs the transaction is identical to an owner of the credit card used in the transaction. The identity verification is performed as a customer signs a transaction slip where transaction content is printed in settlement processing of the transaction, and a clerk visually compares the customer signature with a signature written on the credit card.

In recent years, a terminal device where such signature input and display can be performed is realized using a smart phone or a tablet terminal. Numerous smart phones or tablet terminals are distributed as consumer products, which enable building of a settlement terminal device provided inexpensively. That is, if such settlement terminal devices can be configured using numerous information terminals that are distributed as the consumer products such as smart phones or tablet terminals, it is possible to provide the settlement terminal devices inexpensively. Further, since generalization of development platforms of applications (software) used in the settlement processing and other work is available, it is easy to reuse or divert development resources.

However, an information terminal designed to be used as a consumer product does not have "tamper resistance" necessary for protecting customer information to safely perform the transaction. The "tamper resistance" refers to resistance against an attack of trying to steal information from the information terminal. In order to secure the tamper resistance as a countermeasure against the attack of trying to steal the information from the information terminal, in a mobile device disclosed in US Patent Unexamined Publication No. 2010/0145854 or Japanese Patent Unexamined Publication No. 2004-355211, a portion relating to authentication information of a card used in settlement processing (referred to as a "secure portion" in US Patent Unexamined Publication No. 2010/0145854, in which the "secure portion" is a portion having necessary tamper resistance as a settlement terminal device) is separated from a generic portion.

However, in the above-mentioned information processing device in the related art, the security is secured in the secure portion, but is generally insufficient in the non-secure portion. Thus, when an unauthorized application is installed in the non-secure portion, there is a possibility that a formal input area where authentication information for identity verification (for example, personal identification number (PIN) or signature) is input is illegally hidden. Further, there is a possibility that another unauthorized input area is displayed by the unauthorized application. In these situations, when a user mistakenly considers the unauthorized input area as a formal input area to input authentication information in the unauthorized input area, there is a possibility that phishing of the authentication information occurs.

SUMMARY OF THE INVENTION

An information processing device and a portable settlement terminal device of the disclosure secures security of authentication information to suppress an operator's mistake or incorrect operation even when a secure portion and a non-secure portion are present together.

According to an aspect of the disclosure, there is provided an information processing device, including: a first information processing unit that is accommodated in a housing, and in which a first input display section is provided on an operational surface of the housing; and a secure second information processing unit that is accommodated in a front of the first information processing unit in the housing when gripped by an operator and has tamper resistance, and in which a second input display section is provided in front of the first input display section on the operational surface.

According to another aspect of the disclosure, there is provided a portable settlement terminal device, including: a non-secure first information processing unit that is accommodated in a housing, and in which a first input display section that displays an amount relating to settlement or the like is provided on an operational surface of the housing; and a secure second information processing unit that is accommodated in the housing, and in which a second input display section to which authentication information on a card used in the settlement is input is provided, in which the first input display section and the second input display section are arranged in parallel along a length direction of an operational surface of the housing, and the second input display section is disposed on a lower side with reference to the first input display section when seen from an erect direction of a numeral or the like displayed in the first input display section.

According to the information processing device and the portable settlement terminal device of the present disclosure, it is possible to secure security. Further, a service provider can easily hold the device, and a service receiver can easily perform a settlement operation.

BRIEF DESCRIPTION OF DRAWINGS

FIG. 1A is a front view of a settlement terminal device according to a first exemplary embodiment;

FIG. 1B is a side view of the settlement terminal device shown in FIG. 1A;

FIG. 7A is a front view of a settlement terminal device according to a third exemplary embodiment;

FIG. 7B is a side view of the settlement terminal device shown in FIG. 7A;

FIG. 8 is a block diagram illustrating an example of a hardware configuration in which display is dividedly controlled;

FIG. 10A is a front view of a settlement terminal device according to a fourth exemplary embodiment in which a third input display section is provided;

FIG. 10B is a side view of the settlement terminal device shown in FIG. 10A;

DETAILED DESCRIPTION OF THE PREFERRED EMBODIMENTS

Hereinafter, exemplary embodiments of an information processing device according to the disclosure will be described with reference to the accompanying drawings. In the following exemplary embodiments, as an example of the information processing device according to the disclosure, a settlement terminal device used in settlement processing in transactions of goods or services will be described.

First Exemplary Embodiment

Figure 2:
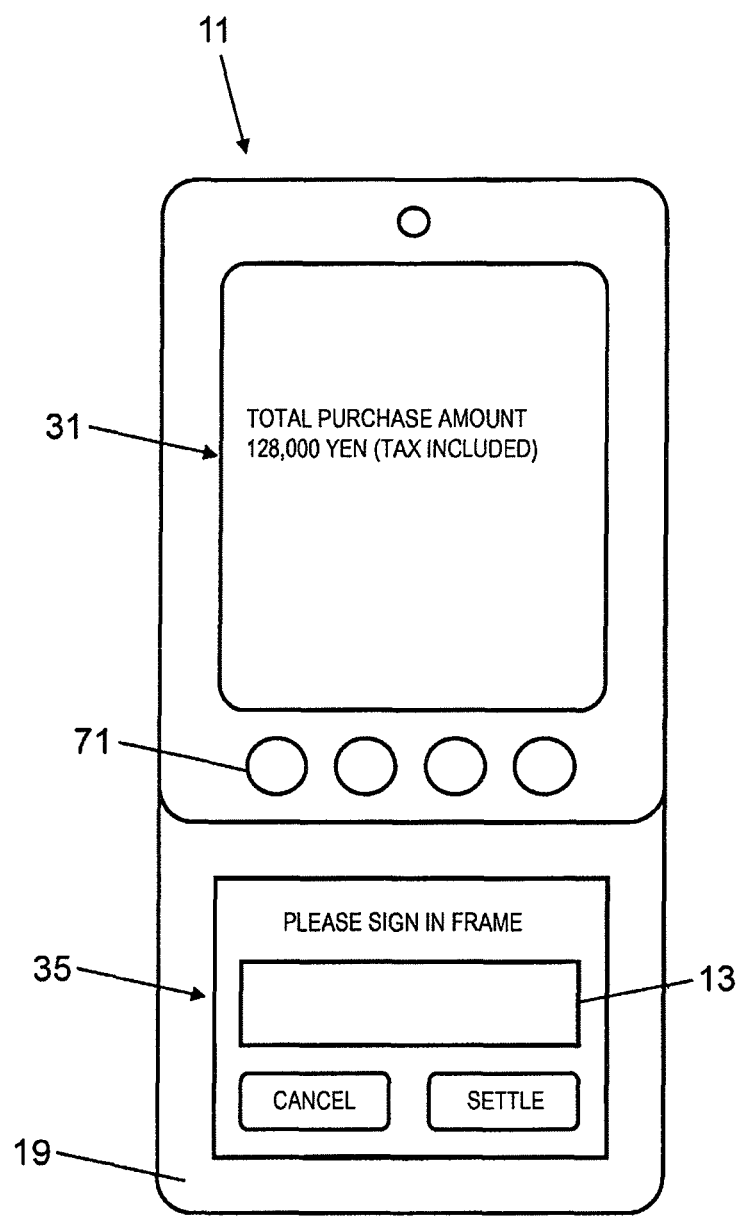
FIG. 2 is a front view illustrating a display example of a signature input screen in the settlement terminal device according to the first exemplary embodiment.
Figure 3:
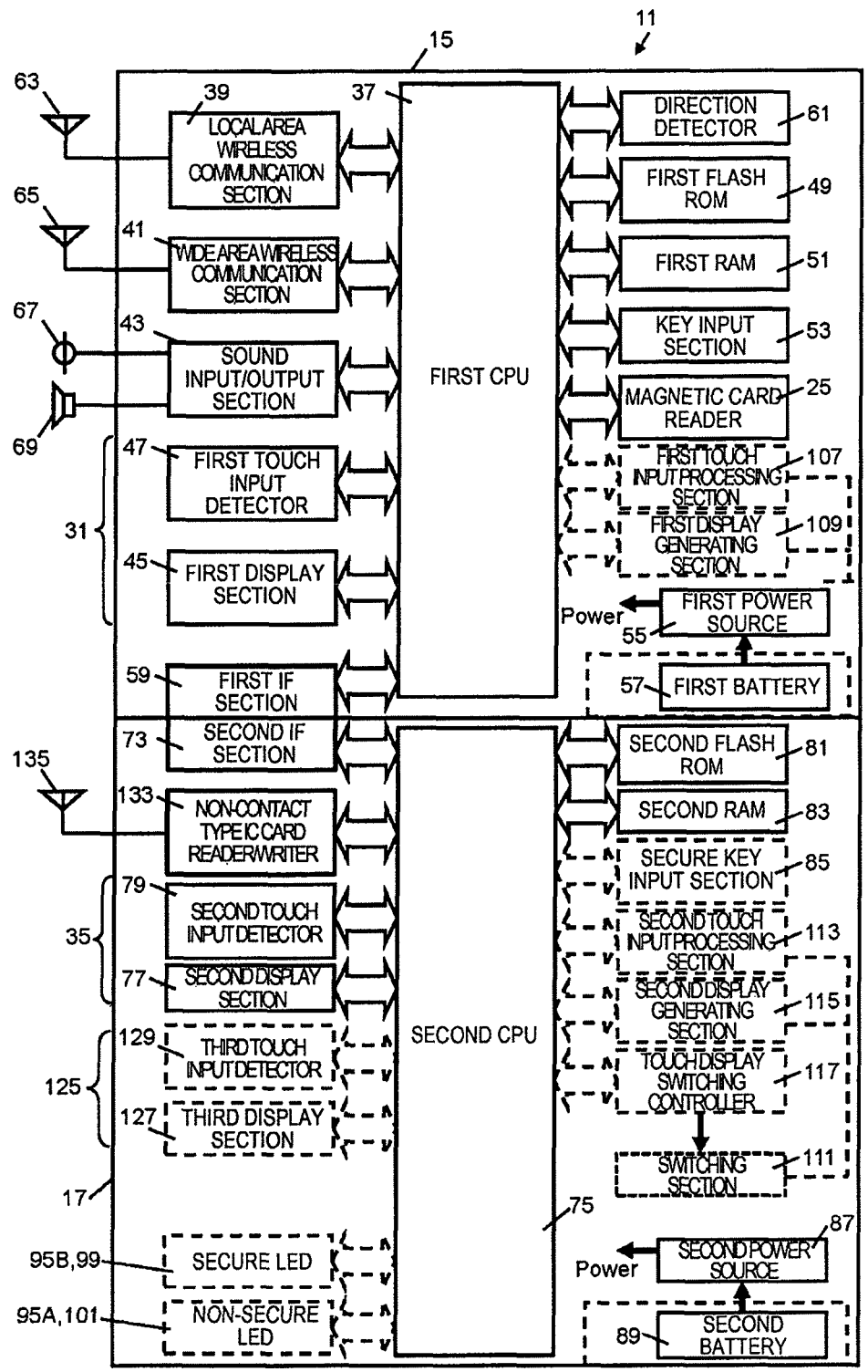
FIG. 3 is a block diagram illustrating an example of a hardware configuration of the settlement terminal device according to the first exemplary embodiment.

FIG. 1A is a front view of settlement terminal device 11 of a first exemplary embodiment. FIG. 1B is a side view of settlement terminal device 11 shown in FIG. 1A. FIG. 2 is a front view illustrating a display example of signature input screen 13 in settlement terminal device 11 of the first exemplary embodiment. FIG. 3 is a block diagram illustrating an example of a hardware configuration of settlement terminal device 11 according to the first exemplary embodiment.

Settlement terminal device 11 of the first exemplary embodiment is a portable type, and for example, includes first information processing unit 15 (see FIG. 3) and second information processing unit 17 that perform a variety of information processing including settlement processing in transactions of goods or services.

Settlement terminal device 11 of the exemplary embodiment includes a first input display section (specifically, first touch panel 31) on operational surface 21 of housing 19. First information processing unit 15 is accommodated in housing 19 in which the first input display section (first touch panel 31) is provided. Secure second information processing unit 17 with tamper resistance is accommodated in front of first information processing unit 15 in housing 19 when gripped by an operator. Second information processing unit 17 includes a second input display section (specifically, second touch panel 35). The second input display section (second touch panel 35) is disposed on operational surface 21 in front of the first input display section (first touch panel 31).

In each exemplary embodiment described below, the "front" means a lower side of housing 19 in which operational surface 21 is in an upright state in a direction along a vertical line, and means a side close to the operator when the operator grips housing 19 so that operational surface 21 is disposed along a surface approximately orthogonal to the vertical line. Accordingly, in settlement terminal device 11 of the exemplary embodiment, when housing 19 is in the upright state so that first input display section (first touch panel 31) and the secure second input display section (second touch panel 35) on operational surface 21 are arranged in the direction along the vertical line, the second input display section (second touch panel 35) is disposed in a lower part of the housing 19 with reference to the first input display section (first touch panel 31). Alternatively, in settlement terminal device 11 of the exemplary embodiment, the first input display section (first touch panel 31) and the secure second input display section (second touch panel 35) may be biased in end portions positioned on opposite sides of settlement terminal device 11 with the center of the housing of settlement terminal device 11 interposed therebetween to be disposed on operational surface 21 which is one surface of the housing of settlement terminal device 11.

Settlement terminal device 11 is a portable type, and includes first information processing unit 15, and secure second information processing unit 17. Here, the "secure" means that tamper resistance is provided. The "tamper" means unauthorized analysis or modification of software or hardware in an information processing device (for example, settlement terminal device 11), unauthorized deprivation, modification, or disabling attack of internal information of the information processing device (for example, settlement terminal device 11). Accordingly, the "tamper resistance" means resistance against such an attack. With the tamper resistance, for example, it is possible to protect customer information in settlement processing, and to safely perform a transaction.

Settlement terminal device 11 is configured so that first information processing unit 15 and second information processing unit 17 can be combined with each other on combining surface 23 of single housing 19. First information processing unit 15 and second information processing unit 17 may not be separated from each other. Further, first information processing unit 15 may be configured as "secure", or may be configured as "non-secure". The "non-secure" means that the tamper resistance is not provided or the tamper resistance is low.

Settlement terminal device 11 is configured so that magnetic card reader 25 is disposed on a side (non-secure side) opposite to the second input display section with the first input display section interposed therebetween. Magnetic card reader 25 includes slit 27 in front surface 29 of first information processing unit 15. Slit 27 refers to a path through which a magnetic card is slid (swiped) to read information (magnetic stripe) of the magnetic card. Slit 27 may be provided in second information processing unit 17 instead of first information processing unit 15.

Settlement terminal device 11 includes two input sections and two display sections (first input display section and second input display section), that is, two touch panels (first touch panel 31 and second touch panel 35). Specifically, first touch panel 31 which is the first input display section is provided on front surface 29 where first information processing unit 15 is provided, and second touch panel 35 which is the second input display section is provided on front surface 33 where second information processing unit 17 is provided. First touch panel 31 displays amount information which is non-secure content, for example, and receives an amount input. Further, second touch panel 35 displays a PIN input screen which is secure content, for example, and receives a PIN input.

FIG. 2 shows a display example of signature input screen 13 in settlement terminal device 11 of the exemplary embodiment. Amount information is displayed on first touch panel 31, for example, and signature input screen 13 which is non-secure content is displayed on second touch panel 35, for example, and receives an input of a signature of an operator (for example, a person who purchases a product in a credit card transaction).

Settlement terminal device 11 shown in FIG. 3 includes first information processing unit 15 and second information processing unit 17. First information processing unit 15 includes first central processing unit (CPU) 37, local area wireless communication section 39, wide area wireless communication section 41, sound input/output section 43, first display section 45, and first touch input detector 47. Further, first information processing unit 15 includes first flash read only memory (ROM) 49, first random access memory (RAM) 51, key input section 53, magnetic card reader 25, first power source 55, first battery 57, and first interface (IF) section 59. In addition, first information processing unit 15 may further include direction detector 61.

In first information processing unit 15, the respective components are connected to first CPU 37. First CPU 37 generally controls the entirety of first information processing unit 15, and for example, performs a variety of controls, processing, setting, determination, decision, confirmation, or the like.

Local area wireless communication section 39 is connected to local area wireless communication antenna 63, and for example, has a function of performing wireless LAN communication using a local area wireless communication channel (not shown). Local area wireless communication section 39 may perform communication (for example, Bluetooth (registered trademark) communication) other than wireless LAN communication.

Wide area wireless communication section 41 is connected to wide area wireless communication antenna 65, and has a function of performing communication through a wide area wireless communication channel (for example, wide area network (WAN)) (not shown). Communication on the wide area wireless communication channel may be performed using mobile communication such as wideband code division multiple access (W-CDMA), universal mobile telecommunications system (UMTS), code division multiple access (CDMA) 2000, or long term evolution (LTE), for example.

Sound input/output section 43 is connected to microphone 67 and speaker 69, and has a function of controlling sound input and output. For example, communication with another mobile phone or a fixed phone may be performed by sound input/output section 43, microphone 67, speaker 69, and wireless telephone line communication section (not shown). Further, speaker 69 is also used to emit sound for alerting a user or warning sound indicating an operational error when the user (clerk or customer) operates settlement terminal device 11, for example.

First display section 45 has a function of controlling display of first touch panel 31 (see FIG. 1A). First touch input detector 47 has a function of detecting a touch input with respect to first touch panel 31.

First flash ROM 49 has a function of storing a variety of data. Data to be stored may be data relating to work, or may be a program for controlling settlement terminal device 11 (for example, first information processing unit 15).

First RAM 51 is a memory used for temporarily storing, when operation processing associated with an operation of settlement terminal device 11 (for example, first information processing unit 15) is performed, for example, processing data generated in the middle of the operation processing.

Key input section 53 has a function of receiving an input through input keys 71 shown in FIG. 1A. Magnetic card reader 25 is disposed in slit 27 shown in FIG. 1A, and has a function of reading a magnetic stripe of a magnetic card.

First power source 55 is mainly used as a power source of first information processing unit 15. First power source 55 is supplied with power from first battery 57, and supplies the power to respective components (for example, first CPU 37) of first information processing unit 15. First CPU 37 may control first power source 55 to supply power or stop the power supply with respect to a part or all of the circuits that form first information processing unit 15. First CPU 37 may also control first power source 55 to supply power to second information processing unit 17.

First information processing unit 15 and second information processing unit 17 are connected to each other through a first interface unit (hereinafter, referred to as first IF section 59) and a second interface unit (hereinafter, referred to as second IF section 73), and perform exchange of a variety of data or commands. First IF section 59 and second IF section 73 may be combined with each other.

Second information processing unit 17 includes second IF section 73, second CPU 75, second display section 77, second touch input detector 79, second flash ROM 81, second RAM 83, secure input section 85, and second power source 87. In the exemplary embodiment, the direction detector is provided in first information processing unit 15, but instead, may be provided in second information processing unit 17.

In second information processing unit 17, the respective components are connected to second CPU 75. Second CPU 75 generally controls the entirety of second information processing unit 17, and for example, performs a variety of controls, processing (for example, settlement processing), setting, determination, decision, confirmation, authentication, or collation (for example, collation of a PIN or a signature).

Second display section 77 has a function of controlling display of second touch panel 35 (see FIG. 1A). Second touch input detector 79 has a function of detecting a touch input to second touch panel 35.

Second flash ROM 81 has a function of storing a variety of data. Data to be stored may be data relating to work, or may be a program for controlling settlement terminal device 11 (for example, second information processing unit 17).

Second RAM 83 is a memory used for temporarily storing, when operation processing associated with an operation of settlement terminal device 11 (for example, second information processing unit 17) is performed, for example, processing data generated in the middle of the operation processing.

Secure input section 85 may have physical keys or software keys for input of a PIN, for example. A signature may be input to secure input section 85, for example. The PIN may be input to secure input section 85 by hand writing using a finger or a stylus pen, for example.

Secure input section 85 is not shown in FIGS. 1A, 1B, and 2, but may be disposed on a rear surface of second information processing unit 17 in FIGS. 1A and 1B, for example. The rear surface of second information processing unit 17 is a surface positioned on a side opposite to front surface 29 (display surface) where second touch panel 35 is provided.

Second power source 87 is mainly used as a power source of second information processing unit 17. Second power source 87 is supplied with power from second battery 89, and supplies the power to the respective components (for example, second CPU 75) of second information processing unit 17. Second CPU 75 may control second power source 87 to supply power or stop the power supply with respect to a part or all of the circuits that form second information processing unit 17. Second CPU 75 may control second power source 87 to supply power to first information processing unit 15.

Further, settlement terminal device 11 includes direction detector 61 that detects the direction of settlement terminal device 11 with respect to gravity. Direction detector 61 is provided in at least one of first information processing unit 15 and second information processing unit 17, for example. Direction detector 61 may be configured using an acceleration sensor, for example. FIG. 3 illustrates an example in which direction detector 61 is provided in first information processing unit 15.

Settlement terminal device 11 is configured so that first information processing unit 15 which is "secure" or "non-secure" and second information processing unit 17 which is "secure" are combined with each other. Input and display of authentication information (for example, signature or PIN information) on a card used in settlement are performed with respect to second touch panel 35 provided in "secure" second information processing unit 17. Accordingly, settlement terminal device 11 can perform input and display of the authentication information on the card used in settlement, and can secure "tamper resistance". A "secure" portion where the "tamper resistance" is necessary is configured as secure module 91 localized in second information processing unit 17.

Since secure module 91 has the tamper resistance, reading of confidential data using non-formal means is prevented. In order to enhance the tamper resistance, a method for enhancing confidentiality so that reading from the outside is not easily performed, or a method for providing a mechanism that detects whether physical blocking of secure module 91 is broken or not may be used. When it is detected that the physical blocking of secure module 91 is broken, secure module 91 may make reading from the outside difficult, or may break a program or data in secure module 91. Secure module 91 may be provided with both of the methods. The method for making the reading from the outside difficult is realized by storing software that is executed to encode the program and to decode the program by a necessary amount when being executed. Further, the method for breaking the program or data against the reading from the outside is realized by providing a circuit that erases, when the blocking of secure module 91 is broken, confidential information or overwrites the confidential information using a predetermined value to safely leave the confidential information, or a circuit which cannot be operated when the blocking of secure module 91 is broken, for example.

On the other hand, as first information processing unit 15, for example, information terminals (for example, smart phone or tablet terminal) that are widely distributed as consumer products may be used. As first information processing unit 15, for example, a generic operating system may be employed as a software platform.

Accordingly, reusing or diverting of development resources of application software for settlement (hereinafter, referred to as "settlement application") and application software for different work (hereinafter, referred to as "work application") becomes easy. Further, the settlement application and the work application are processed by first information processing unit 15 having high operation performance, to be flexibly operated without stress.

Settlement terminal device 11 operates a settlement application (not shown) installed in first information processing unit 15 to start a settlement procedure. Settlement terminal device 11 receives information relating to settlement (for example, amount information, payment method, or card brand information used in settlement) by an input of the settlement application or from the outside of settlement terminal device 11.

After settlement terminal device 11 receives the information relating to the settlement, for example, as shown in FIGS. 1A and 1B, first CPU 37 and first touch panel 31 perform a process and a display for urging a reading operation of the card used in the settlement.

The process and display for urging the reading operation of the card used in the settlement are performed until it is confirmed that the card reading is completed. After it is confirmed that the card reading is completed, settlement terminal device 11 starts an authentication procedure of the card.

A card authentication method is determined, for example, based on the type of the card used in settlement, information on the card, or a contract between a member store (credit card member store that deals with credit card transactions) that uses settlement terminal device 11, and a settlement center.

When the authentication method is based on the PIN, settlement terminal device 11 displays a PIN input screen with respect to second touch panel 35 disposed in second information processing unit 17, and waits for completion of the PIN input of a user of the card (for example, a person who purchases a product in the credit card transaction). The PIN input screen is a screen where the PIN can be input. The display of the PIN input screen is performed until it is confirmed that the PIN input is completed, for example.

If it is confirmed that the PIN input is completed, settlement terminal device 11 waits for a collation result about whether the input PIN matches a PIN registered in the card used in settlement or a PIN registered in the settlement center.

The PIN collation is performed by the settlement center, for example. Settlement terminal device 11 encodes the input PIN, and transmits the encoded PIN and the card information to the settlement center.

The settlement center decodes the PIN received from settlement terminal device 11, and collates the decoded PIN with the PIN managed in the settlement center. When the two PINs match each other, and when it is confirmed that the card having the card information transmitted together with the PIN does not have any problem in the transaction (for example, when the card is not on a black list), the settlement center gives credit to settlement terminal device 11.

Settlement terminal device 11 receives the credit from the settlement center, and performs sales processing as subsequent settlement processing, and then, terminates communication with the settlement center. Settlement terminal device 11 may perform transmission of data on the sales processing to the settlement center between the time when the sales processing is completed and the time when the communication with the settlement center is terminated, or later together with sales proceeding data of another settlement:

When two PINs do not match each other, the settlement center notifies settlement terminal device 11 that the credit cannot be given. Settlement terminal device 11 receives the notification from the settlement center, and does not perform the sales processing, so that the settlement is stopped.

When the authentication information is based on the PIN, the PIN collation may be performed between settlement terminal device 11 and a credit card (not shown) read in settlement terminal device 11. If a collation result indicating that the input PIN matches a PIN stored in advance in a chip (not shown) in the credit card is obtained from the chip in the credit card, settlement terminal device 11 performs the sales processing as subsequent settlement processing.

Settlement terminal device 11 may perform transmission of data on the sales processing to the settlement center immediately after completion of the sales processing or before termination of communication with the settlement center, or later together with sales processing data of another settlement. When a collation result indicating that two PINs do not match each other, the sales processing in settlement terminal device 11 is stopped, and thus, the settlement is stopped.

When the authentication method is based on the signature, settlement terminal device 11 displays signature input screen 13 with respect to second touch panel 35 disposed in second information processing unit 17, and waits for completion of the signature input of the user of the card. Signature input screen 13 is a screen where a signature can be input, shown in FIG. 2, for example. The display of signature input screen 13 is performed until it is confirmed that the signature input is completed, for example. If it is confirmed that the signature input is completed, settlement terminal device 11 executes the settlement processing.

The above-described operation examples are performed by cooperation of first information processing unit 15 and "secure" second information processing unit 17 provided in settlement terminal device 11. The settlement application is operated in first information processing unit 15. Display of information relating to settlement (for example, amount information, payment method, or information on card brand used in settlement) or display for urging a reading operation of the card used in settlement may be performed by any one of first information processing unit 15 and "secure" second information processing unit 17.

On the other hand, the display of the PIN input screen or signature input screen 13 is performed by second touch panel 35 disposed in "secure" second information processing unit 17. The display of the PIN input screen or signature input screen 13 is performed until the PIN input or signature by the user of the card is completed after the display for urging the reading operation of the card used in settlement is performed and the reading of the card used is performed.

As described above, settlement terminal device 11 can perform input and display of authentication information (for example, signature or PIN) of a card used in settlement by a customer, and can secure the "tamper resistance".

In settlement terminal device 11 according to the exemplary embodiment, secure second information processing unit 17 may be disposed to be spaced from first information processing unit 15. Thus, second information processing unit 17 can be concentratively disposed as secure module 91 in a necessary minimum space. Accordingly, second information processing unit 17 easily secures the tamper resistance (security). Further, as secure dedicated second touch panel 35 is provided separately from first touch panel 31, the operator can easily recognize an input area where security is guaranteed. In this way, settlement terminal device 11 can notify an operator that second touch panel 35 is an area where security of input of authentication information (PIN or the like) is guaranteed. As a result, safe input of the authentication information can be secured, and thus, secure processing of the input authentication information is realized. Further, second information processing unit 17 provided in second touch panel 35 may include a housing having a color (and surface treatment) different from that of first information processing unit 15. Alternatively, a background color of the display in secure dedicated second touch panel 35 may be different from a background color of the display in first touch panel 31 provided in first information processing unit 15. Thus, it is possible to notify the operator that second touch panel 35 is an area where the security of the input of the authentication information (PIN or the like) is guaranteed.

Further, in settlement terminal device 11, magnetic card reader 25 is disposed in first information processing unit 15 spaced from secure second information processing unit 17. Accordingly, second information processing unit 17 can be concentratively disposed at a necessary minimum space. Thus, in second information processing unit 17, the tamper resistance is physically secured with ease. As a result, settlement terminal device 11 can easily perform a magnetic card reading swipe operation while securing a high level of security of safely inputting authentication information such as a PIN.

Second Exemplary Embodiment

Figure 4A:
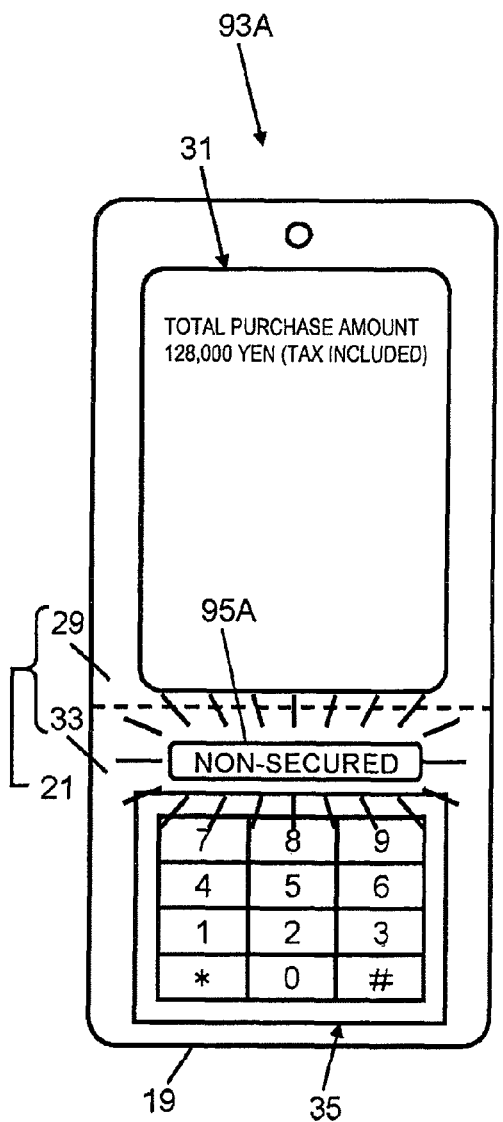
FIG. 4A is a front view of a settlement terminal device according to a second exemplary embodiment.
Figure 4B:
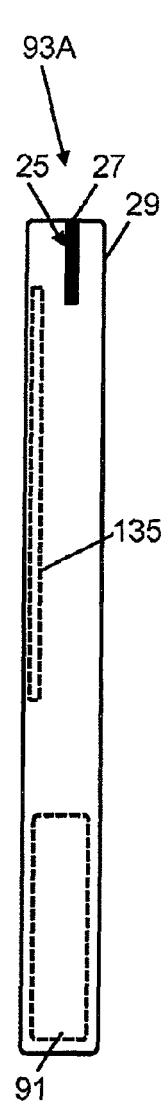
FIG. 4B is a side view of the settlement terminal device shown in FIG. 4A.
Figure 5:
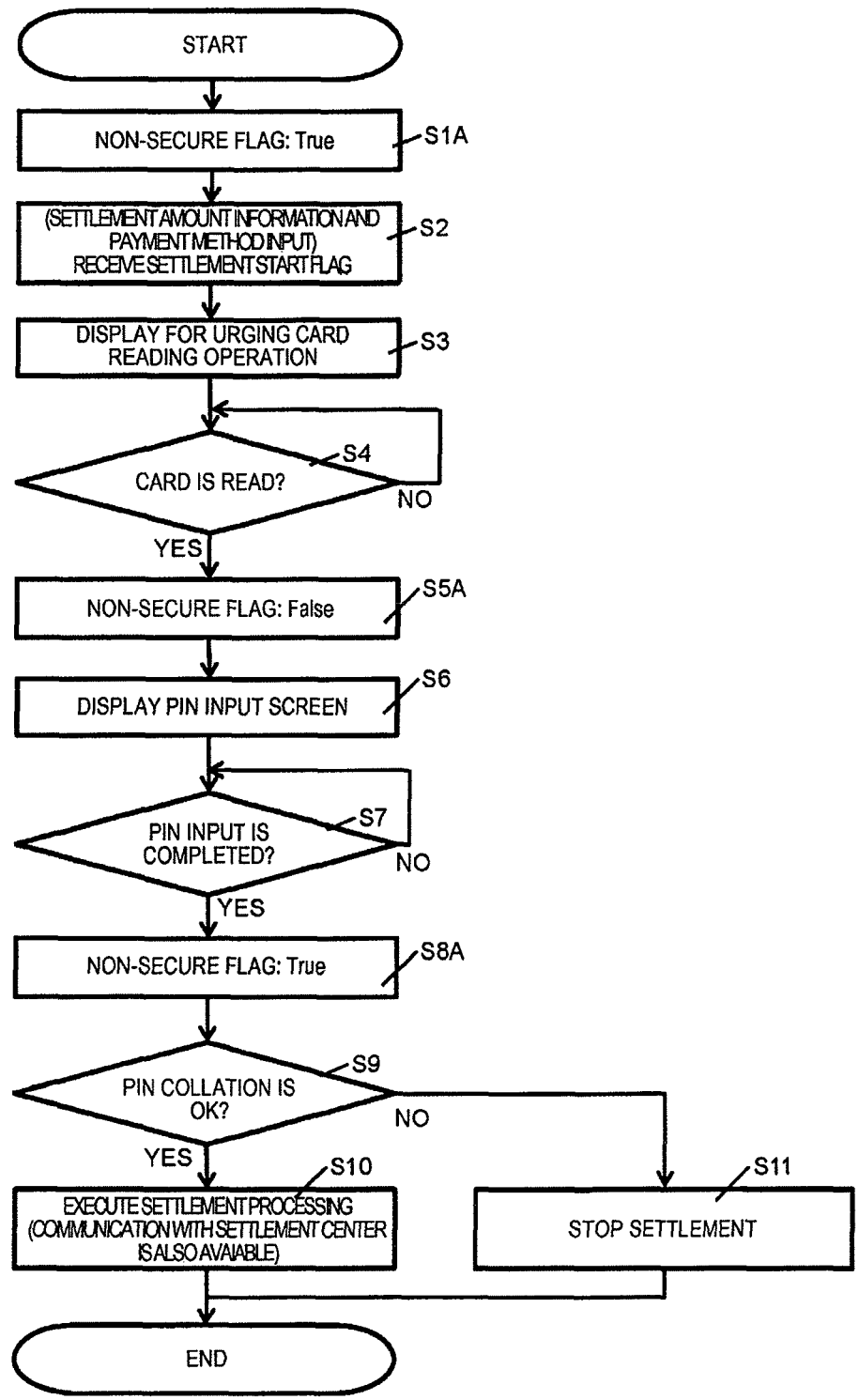
FIG. 5 is a flowchart specifically illustrating an operation procedure in settlement processing of the settlement terminal device of the second exemplary embodiment.

FIG. 4A is a front view of settlement terminal device 93A according to a second exemplary embodiment. FIG. 4B is a side view of settlement terminal device 93A shown in FIG. 4A. In each exemplary embodiment described below, the same reference numerals are given to the same members and portions shown in FIGS. 1A to 3, and description thereof will not be repeated. FIG. 5 is a flowchart specifically illustrating an operation procedure when performing settlement processing of settlement terminal device 93A of the second exemplary embodiment.

Settlement terminal device 93A of the exemplary embodiment turns off non-secure LED (secure state display section) 95A indicating that first information processing unit 15 is in a non-secure mode when authentication information (for example, PIN or signature) is input, and turns on non-secure LED 95A indicating that first information processing unit 15 is in the non-secure mode at a time other than the time when the authentication information is input. Non-secure LED 95A is disposed on operational surface 21 between first touch panel 31 and second touch panel 35 (see FIG. 4A).

Next, an operation in settlement processing of settlement terminal device 93A of the exemplary embodiment will be described with reference to FIG. 5. Settlement terminal device 93A executes a terminal UI settlement application (not shown) installed in second information processing unit 17 to start the procedure of the settlement processing. For description of FIG. 5, it is assumed that settlement terminal device 93A is in a non-secure mode state. Non-secure LED 95A is in a turned-on state.

In FIG. 5, first, an operating system (not shown) sets a non-secure flag to "True" in order to indicate that first information processing unit 15 is in the non-secure mode state (S1A). If the non-secure flag is set to "True", second CPU 75 causes non-secure LED 95A to turn on "NON SECURED" (see FIG. 4A).

For example, if the terminal UI settlement application (specifically, first CPU 37) installed in first information processing unit 15 receives settlement amount information and a payment method (S2), the terminal UI settlement application displays a message for urging the card reading operation on first touch panel 31 (S3).

An IC card input/output driver (not shown) waits until an IC card is read by any one operation of sliding of the IC card in the slit by a user, insertion of the IC card to an insert port, and approach of the IC card to front surface 29 of settlement terminal device 93A (S4). If the IC card is read (S4, YES), the operating system (not shown) changes the non-secure flag to "False" in order to indicate that first information processing unit 15 transitions to a secure mode state (S5A). If the non-secure flag is changed to "False", second CPU 75 causes non-secure LED 95A to turn off the "NON SECURED" turned-on in step S1A.

For example, the secure screen UI application (specifically, second CPU 75) installed in second information processing unit 17 gives an instruction for displaying a message for urging the user to input PIN information to first touch panel 31 and a PIN pad which is an example of a software keyboard, through second IF section 73, first IF section 59, and first CPU 37 (S6).

Second CPU 75 inputs the PIN information input from second touch panel 35 through second touch input detector 79 (S7).

If the PIN information is input to second touch input detector 79, the operating system changes the non-secure flag to "True" in order to indicate that first information processing unit 15 transitions to the non-secure mode state (S8A). If the non-secure flag is changed to "True", second CPU 75 causes non-secure LED 95A to turn on the "NON SECURED" turned off in step S5A (see FIG. 4A). The turning-on and turning-off of the "NON-SECURED" in non-secure LED 95A are controlled under second CPU 75 of secure second information processing unit 17, that is, under a secure execution environment.

In the operation procedure of the settlement processing where PIN collation shown in FIG. 5 is necessary, the PIN information input in step S7 may be encoded by decoding keys that can be decoded by the IC card for which the reading is performed in step S4. The PIN information input by second touch panel 35 may be encoded in step S7. The PIN information encoded in this way (encoded PIN information) is output to second CPU 75.

Second CPU 75 transmits the PIN information or the encoded PIN information to the IC card through a predetermined driver (not shown) (for example, an IC card input/output driver or an IC card reader driver).

The IC card collates data obtained by decoding the PIN information or the encoded PIN information obtained by second CPU 75 with PIN information that is registered in advance in the IC card (S9), and outputs the PIN collation result. Second CPU 75 receives an input of the PIN collation result output from the IC card through the IC card reader driver and the IC card input/output driver.

If the collation result indicating that the PIN information input in step S7 matches the PIN information registered in the IC card read in step S4 is obtained from the IC card, second CPU 75 instructs the terminal UI settlement application (specifically, first CPU 37) installed in first information processing unit 15 to perform sales processing which is subsequent settlement processing (S10).

In first information processing unit 15, if the collation result indicating that the PIN information input in step S7 matches the PIN information registered in the IC card read in step S4 is obtained from the IC card, the terminal UI settlement application (specifically, first CPU 37) performs the sales processing which is the subsequent settlement processing. Sales processing data after the sales processing is transmitted to the settlement center through a center connection application (for example first CPU 37) installed in first information processing unit 15. The sales processing relating to the sales processing data shown in step S10 may be executed whenever a customer purchases a product or is supplied with a service, or may be processed, when communication between settlement terminal device 93A and the settlement center is performed at a predetermined timing (for example, once a week), in a batch together with another sales processing data at that time.

On the other hand, as the collation result of the PIN information in step S9, when it is determined that both the pieces of PIN information do not match each other, second CPU 75 causes the secure screen UI application (specifically, second CPU 75) installed in second information processing unit 17 to display a message for stopping settlement processing on first touch panel 31 (S11). Second CPU 75 does not instruct the terminal UI settlement application (specifically, first CPU 37) installed in first information processing unit 15 to perform the sales processing, and then, the procedure of the subsequent settlement processing is stopped.

In settlement terminal device 93A, the non-secure display (for example, "NON SECURED") is turned on or turned off by non-secure LED 95A. Non-secure LED 95A is provided at such a position as to be arranged adjacent to secure second touch panel 35 on the front side. In this way, settlement terminal device 93A causes the operator to know that second touch panel 35 is an area where security of the input of the authentication information (PIN or the like) is guaranteed by visually recognizing secure LED 95A that is adjacently disposed. As a result, the authentication information can be safely input, and thus, secure processing of the input authentication information is realized.

Modification Example of Second Exemplary Embodiment

Figure 4C:
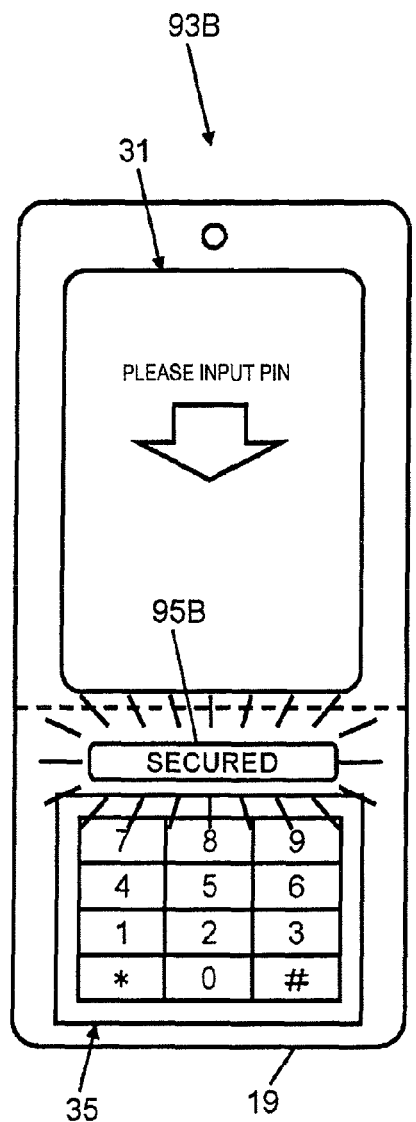
FIG. 4C is a front view of a settlement terminal device according to a modification example of the second exemplary embodiment.
Figure 6:
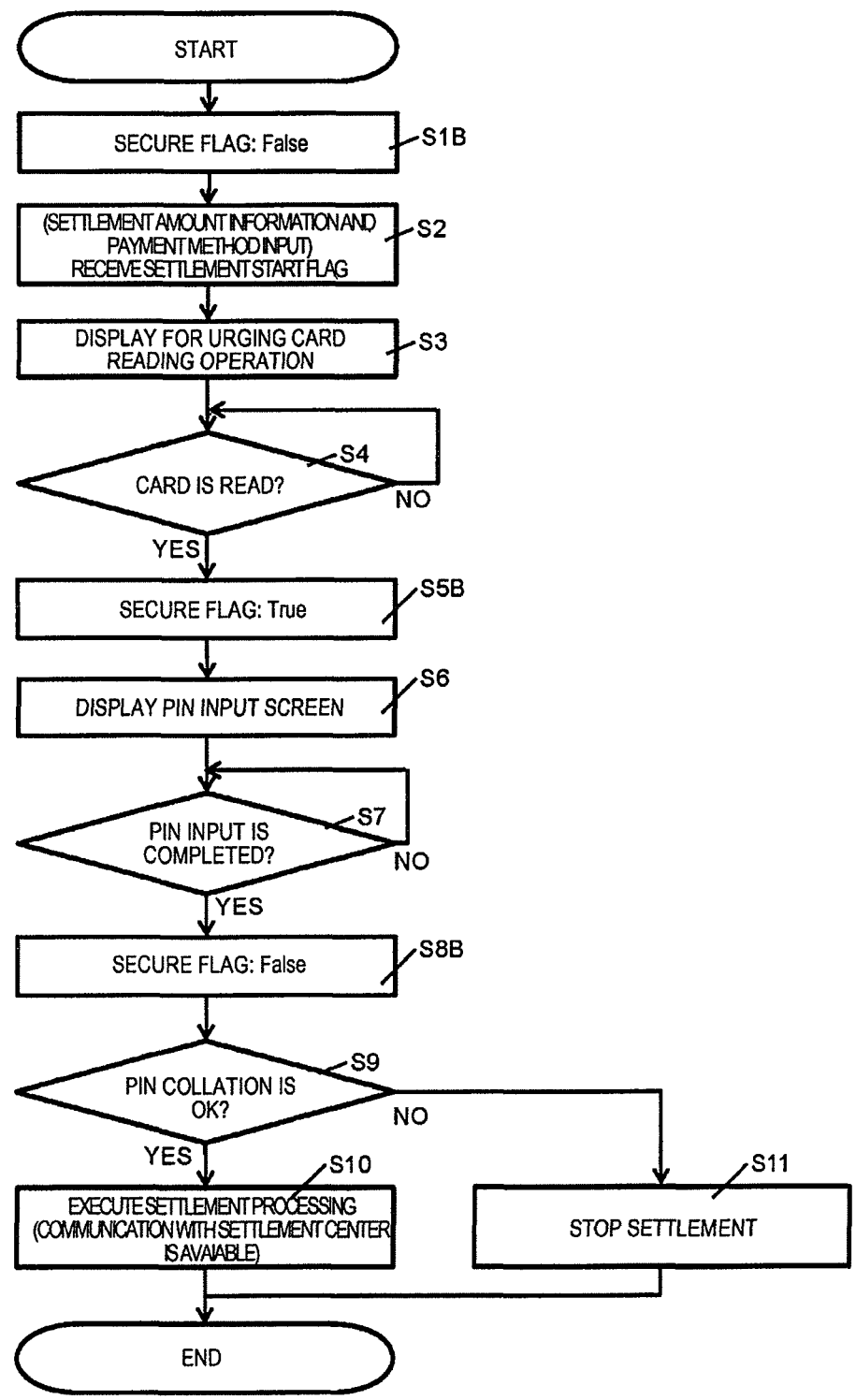
FIG. 6 is a flowchart specifically illustrating an operation procedure in settlement processing of a settlement terminal device according to a modification example of the second exemplary embodiment.

FIG. 4C is a front view of settlement terminal device 93B of a modification example of the second exemplary embodiment. FIG. 6 is a flowchart specifically illustrating an operation procedure in settlement processing of settlement terminal device 93B of a modification example of the second exemplary embodiment (hereinafter, referred to as "the modification example"). Settlement terminal device 93B executes a terminal UI settlement application (not shown) installed in second information processing unit 17 to start the procedure of the settlement processing. When describing FIG. 6, it is assumed that settlement terminal device 93B is in a non-secure mode state. Secure LED 95B is in a turned-off state.

Settlement terminal device 93B of the modification example turns on secure LED (secure state display section) 95B indicating that first information processing unit 15 is in a secure mode when authentication information (for example, PIN or signature) is input, for example, and turns off secure LED 95B indicating that first information processing unit 15 is in the secure mode at a time other than the time when the authentication information is input. Secure LED 95B is disposed on operational surface 21 between first touch panel 31 and second touch panel 35 (see FIG. 4C).

In FIG. 6, first, an operating system (not shown) sets a secure flag to "False" in order to indicate that first information processing unit 15 is in a non-secure mode state (S1B). If the secure flag is set to "False", second CPU 75 causes secure LED 95B to turn off "SECURED". The "SECURED" (secure LED 95B) in FIG. 4C shows a turned-on state, but "SECURED" in step S1B is in a turned-off state.

For example, after receiving inputs of settlement amount information and payment method (S2), the terminal UI settlement application (specifically, first CPU 37) installed in first information processing unit 15 displays a message for urging a card reading operation on first touch panel 31 (S3).

An IC card input/output driver (not shown) waits until an IC card is read by any one operation of sliding of the IC card in the slit by a user, insertion of the IC card to an insert port, and approach of the IC card to front surface 29 of settlement terminal device 93B (S4). If the IC card is read (S4, YES), the operating system (not shown) changes the secure flag to "True" in order to indicate that first information processing unit 15 transitions to the secure mode state (S5B). If the secure flag is changed to "True", second CPU 75 causes secure LED 95B to turn on the "SECURED" turned off in step S1B (see FIG. 4C).

For example, if the secure screen UI application (specifically, second CPU 75) installed in second information processing unit 17 gives an instruction displaying a message for urging the user to input the PIN information to first touch panel 31 and a PIN pad which is an example of a software keyboard, through second IF section 73, first IF section 59 and first CPU 37 (S6).

Second CPU 75 inputs the PIN information input through second touch panel 35 through second touch input detector 79 (S7).

If the PIN information is input to second touch input detector 79, the operating system changes the secure flag to "False" in order to indicate that first information processing unit 15 transitions to the non-secure mode state (S8B). If the secure flag is changed to "False", second CPU 75 causes non-secure LED 95B to turn off the "SECURED" turned on in step S5B. Turning-on and turning-off of the "SECURED" in secure LED 95B are controlled under second CPU 75 of secure second information processing unit 17, that is, under a secure execution environment.

The operation procedure after step S9 in the settlement processing of settlement terminal device 93B of the modification example is the same as the operation procedure after step S9 in the settlement processing of settlement terminal device 93A of the second exemplary embodiment.

In settlement terminal device 93B, the secure display ("SECURED") is turned on or turned off by secure LED-95B. Secure LED 95B is provided at such a position as to be arranged adjacent to secure second touch panel 35 on the front side. In this way, settlement terminal device 93B causes the operator to know that second touch panel 35 is an area where security of the input of the authentication information (PIN or the like) is guaranteed by visually recognizing secure LED 95B that is adjacently disposed. As a result, the authentication information can be safely input, and thus, secure processing of the input authentication information is realized.

In either of settlement terminal device 93A in FIG. 4A or settlement terminal device 93B in FIG. 4C, the housing of second information processing unit 17 where second touch panel 35 is provided may have a color (and surface treatment) different from that of the housing of first information processing unit 15. Specifically, the color (and surface treatment) of the housing of settlement terminal device 93A or settlement terminal device 93B may be changed using a broken line between first touch panel 31 and non-secure LED 95A (FIG. 4A) or secure LED 95B (FIG. 4C) as a boundary. Alternatively, a background color of the display in secure dedicated second touch panel 35 may be different from a background color of the display in first touch panel 31. Thus, it is possible to notify an operator that second touch panel 35 is an area where security of the input of the authentication information (PIN or the like) is guaranteed.

Third Exemplary Embodiment

FIG. 7A is a front view of settlement terminal device 97 according to a third exemplary embodiment. FIG. 7B is a side view of settlement terminal device 97 shown in FIG. 7A. In settlement terminal device 97 of the exemplary embodiment, secure LED (secure state display section) 99 which is an example of a secure notification section that performs secure notification (for example, display or turning-on) indicating that first information processing unit 15 is in the secure mode is disposed between first touch panel 31 and second touch panel 35. Further, in settlement terminal device 97 of the exemplary embodiment, non-secure LED (secure state display section) 101 which is an example of a non-secure notification section that performs non-secure notification (for example, display or turning-on) indicating that first information processing unit 15 is in the non-secure mode is disposed on a side opposite to secure LED 99 with first touch panel 31 interposed therebetween.

Further, in settlement terminal device 97, secure display area 103 is displayed on a display screen of first touch panel 31 on a side close to second touch panel 35. In secure display area 103, for example, "Please input PIN" or the like is displayed. In first touch panel 31, a display area other than secure display area 103 serves as non-secure display area 105. Non-secure display area 105 is set to have an area wider than that of secure display area 103.

FIG. 8 is a block diagram illustrating an example of a hardware configuration in which display is dividedly controlled. Settlement terminal device 97 further includes first touch input processing section 107 and first display generating section 109 in first information processing unit 15 shown in FIG. 3, and further includes switching section 111, second touch input processing section 113, second display generating section 115, and touch display switching controller 117 in second information processing unit 17 shown in FIG. 3.

First touch input processing section 107 obtains an input value of first touch input detector 47 input in non-secure display area 105 of first touch panel 31. First display generating section 109 generates display data (for example, "total purchase amount") in non-secure display area 105 by first CPU 37 based on the input value obtained in first touch input detector 47. Further, first display generating section 109 generates display data (for example, "Please input PIN") in secure display area 103 by second CPU 75, and causes the operator to input a PIN through first touch input detector 47.

Switching section 111 switchably connects first touch input detector 47 and first display section 45 to first touch input processing section 107 and first display generating section 109 or second touch input processing section 113 and second display generating section 115, according to a display area switching instruction from touch display switch controller 117.

Second touch input processing section 113 obtains an input value of first touch input detector 47 input in secure display area 103 of first touch panel 31. Second display generating section 115 generates display data in secure display area 103 by second CPU 75 based on the input value obtained in first touch input detector 47.

Touch display switching controller 117 transmits the display area switching instruction to switching section 111 according to an instruction from second CPU 75. Thus, first touch panel 31 is constantly subject to the display control (prompt-controlled) by touch display switching controller 117 in secure second information processing unit 17.

In settlement terminal device 97, second touch panel 35 and secure LED 99 are provided at such positions as to be adjacently arranged on the front side. As second touch panel 35 and secure LED 99 are disposed to be spaced from first touch panel 31 and non-secure LED 101, the operator can easily recognize that second touch panel 35 is an area where security is guaranteed, and can safely input the authentication information.

Further, a background color of the display in secure dedicated second touch panel 35 may be different from a background color of the display in non-secure display area 105 of first touch panel 31. In addition, a background color of the display in secure display area 103 of first touch panel 31 and the background color of the display in secure dedicated second touch panel 35 may be the same color or similar colors. The background color of the display in secure display area 103 of first touch panel 31 may be different from the background color of the display in non-secure display area 105 of first touch panel 31. The color (and surface treatment) of the housing of settlement terminal device 97 may be changed using a broken line between non-secure display area 105 and secure display area 103 of first touch panel 31 as a boundary. Furthermore, a groove or a linear protrusion indicating the boundary may be provided in the housing corresponding to a portion of the broken line between non-secure display area 105 and secure display area 103 of first touch panel 31. Thus, it is possible to notify the operator that secure display area 103 of first touch panel 31 and second touch panel 35 are areas where security of the display or input of the authentication information (PIN or the like) is guaranteed.

That is, non-secure and secure are clearly distinguished, compared with an arrangement where one switching display section 95 (see FIGS. 4A to 4C) is present between first touch panel 31 and second touch panel 35. In this way, settlement terminal device 97 can notify an operator which area is an area where security of input of authentication information is guaranteed, to thereby make it possible to securely process the input authentication information. Further, by more easily distinguishing between secure and non-secure, it is possible to secure non-secure display area 105 of first touch panel 31 to be wider than the width (length, width) of secure display area 103 of second touch panel 35. Thus, in first touch panel 31, it is possible to enhance flexibility and diversity of display from an application.

Further, in settlement terminal device 97, secure display area 103 is displayed on a display screen on the second touch panel side of first touch panel 31. Specifically, in secure display area 103, for example, "Please input PIN" is displayed. It is possible to enhance visibility that second touch panel 35 is in the secure mode using a part of non-secure first touch panel 31 through a wide display area. In this case, first touch panel 31 is constantly subject to the display control (prompt-controlled) by secure second information processing unit 17.

Figure 9A:
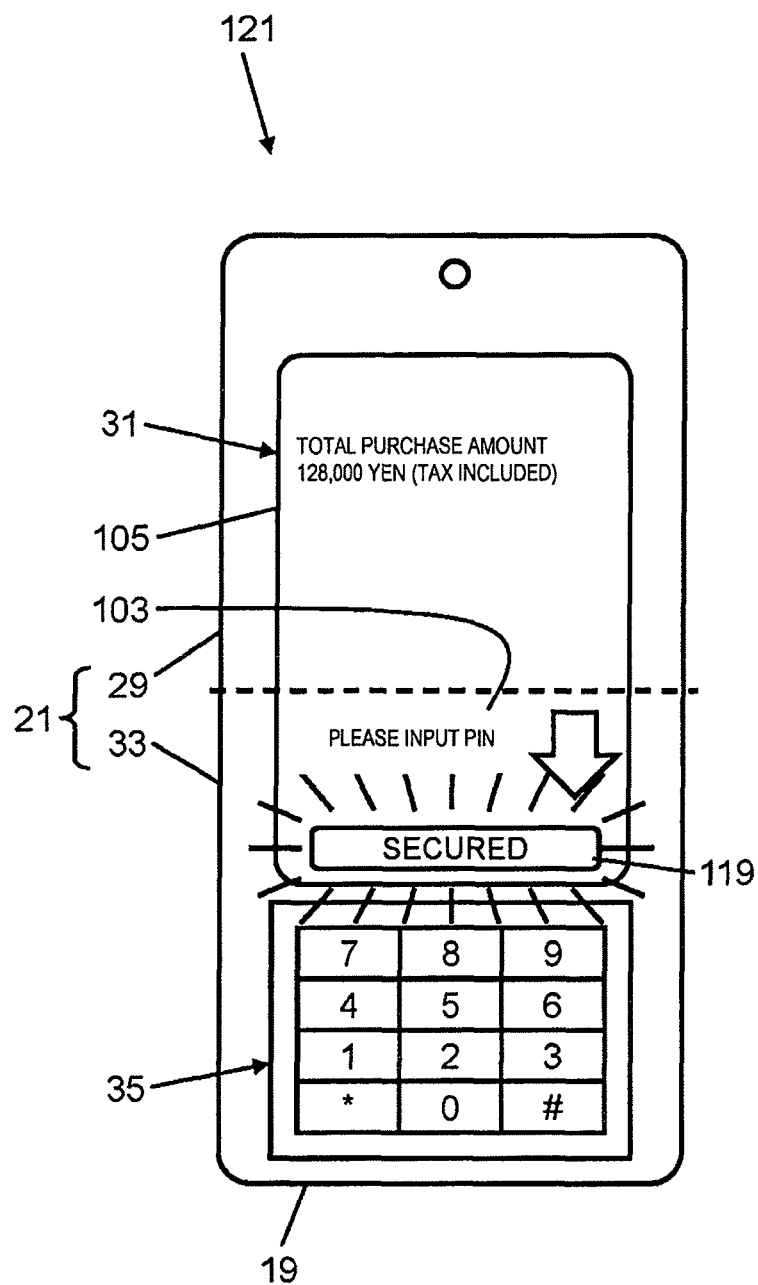
FIG. 9A is a front view of a settlement terminal device according to a modification example of the third exemplary embodiment in which a secure display area is displayed on a display surface.
Figure 9B:
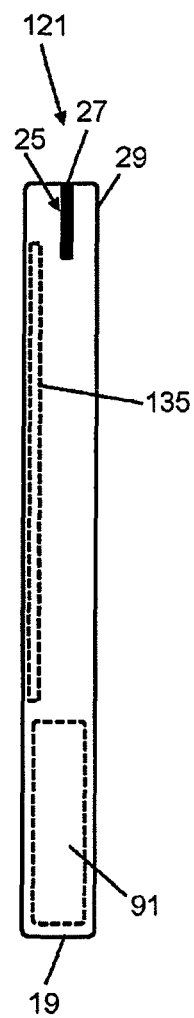
FIG. 9B is a side view of the settlement terminal device shown in FIG. 9A.

FIG. 9A is a front view of settlement terminal device 121 of a modification example of the third exemplary embodiment in which secure state display area 119 is displayed on a display surface. FIG. 9B is a side view of settlement terminal device 121 shown in FIG. 9A. Settlement terminal device 121 displays, on a display surface of first touch panel 31 on a side close to second touch panel 35, secure display area 103, and secure state display area 119 which is an example of a switching display area to be displayed by switching a secure display (SECURED) indicating a secure mode or a non-secure display (NON SECURED) indicating a non-secure mode. Settlement terminal device 121 may or may not display the secure display indicating the secure mode (SECURED), or may or may not display the non-secure display indicating the non-secure mode (NON SECURED), in secure state display area 119. Here, at least one of the secure display (SECURED) in the secure mode and the non-secure display (NON SECURED) in the non-secure mode is necessarily displayed.

In settlement terminal device 121, secure display area 103 and secure state display area 119 are displayed on the display surface of first touch panel 31 on the second touch panel side. Specifically, in secure display area 103, for example, "Please input PIN" is displayed. In secure state display area 119, for example, "SECURED" is displayed. Second CPU 75 of second information processing unit 17 is configured to constantly display-control (prompt-control) first touch panel 31. Thus, the secure or non-secure display is performed on the display surface of first touch panel 31 on the side close to second touch panel 35. As a result, a secure or non-secure dedicated display section (secure LED 99 or non-secure LED 101) is not necessary, and thus, a structure for the secure or non-secure display can be simplified.

Further, the background color of the display in secure display area 103 of first touch panel 31 may be different from the background color of the display in non-secure display area 105 of first touch panel 31. The background color of the display in secure dedicated second touch panel 35 may be different from the background color of the display in non-secure display area 105 of first touch panel 31. Further, the background color of the display in secure display area 103 of first touch panel 31 and the background color of the display in secure dedicated second touch panel 35 may be the same color or may be similar colors. The color (and surface treatment) of the housing of settlement terminal device 97 may be changed using a broken line between non-secure display area 105 and secure display area 103 of first touch panel 31 as a boundary. Furthermore, a groove or a linear protrusion indicating the boundary may be provided in the housing corresponding to a portion of the broken line between non-secure display area 105 and secure display area 103 of first touch panel 31. Thus, it is possible to notify an operator that secure display area 103 of first touch panel 31 and second touch panel 35 are areas where security of display or input of authentication information (PIN or the like) is guaranteed.

Fourth Exemplary Embodiment

FIG. 10A is a front view of settlement terminal device 123 according to a fourth exemplary embodiment in which a third input display section is provided. FIG. 10B is a side view of settlement terminal device 123 shown in FIG. 10A. In settlement terminal device 123 of the exemplary embodiment, third touch panel 125 which is the third input display section having secure display area 103 is disposed between first touch panel 31 and second touch panel 35. Third touch panel 125 includes third display section 127 (see FIG. 3) and third touch input detector 129. Third display section 127 has a function of controlling display of third touch panel 125. Third touch panel 129 has a function of detecting a touch input to third touch panel 125.

In settlement terminal device 123, second touch panel 35 and third input display section are provided at such positions as to be adjacently arranged on the front side. Since second touch panel 35 and the third input display section are disposed to be spaced from non-secure first touch panel 31. In this way, in settlement terminal device 123, second touch panel 35 and the third input display section are grouped to be separated from first touch panel 31. Thus, it is possible to clearly notify an operator that second touch panel 35 is an area where security of input of authentication information (PIN or the like) is guaranteed. As a result, it is possible to safely input the authentication information, and can realize secure processing of the input authentication information. Further, by easily distinguishing between secure and non-secure, it is possible to secure non-secure display area 105 of first touch panel 31 to be wider than the width (length, width) of secure display area 103 of second touch panel 35. Thus, in first touch panel 31, it is possible to enhance flexibility and diversity of display from an application.

Further, a background color of the display in third touch panel 125 may be different from a background color of the display in first touch panel 31. In addition, a background color of the display in secure dedicated second touch panel 35 may be different from the background color of the display in first touch panel 31. Furthermore, the background color of the display in third touch panel 125 and the background color of the display in secure dedicated second touch panel 35 may be the same color or similar colors. The color (and surface treatment) of the housing of settlement terminal device 123 may be changed using a broken line between first touch panel 31 and third touch panel 125 as a boundary. A groove or a linear protrusion indicating the boundary may be provided in the housing corresponding to a portion of the broken line between first touch panel 31 and third touch panel 125. Thus, it is possible to notify an operator that second touch panel 35 and third touch panel 125 are areas where security of display or input of authentication information (PIN or the like) is guaranteed.

Figure 11A:
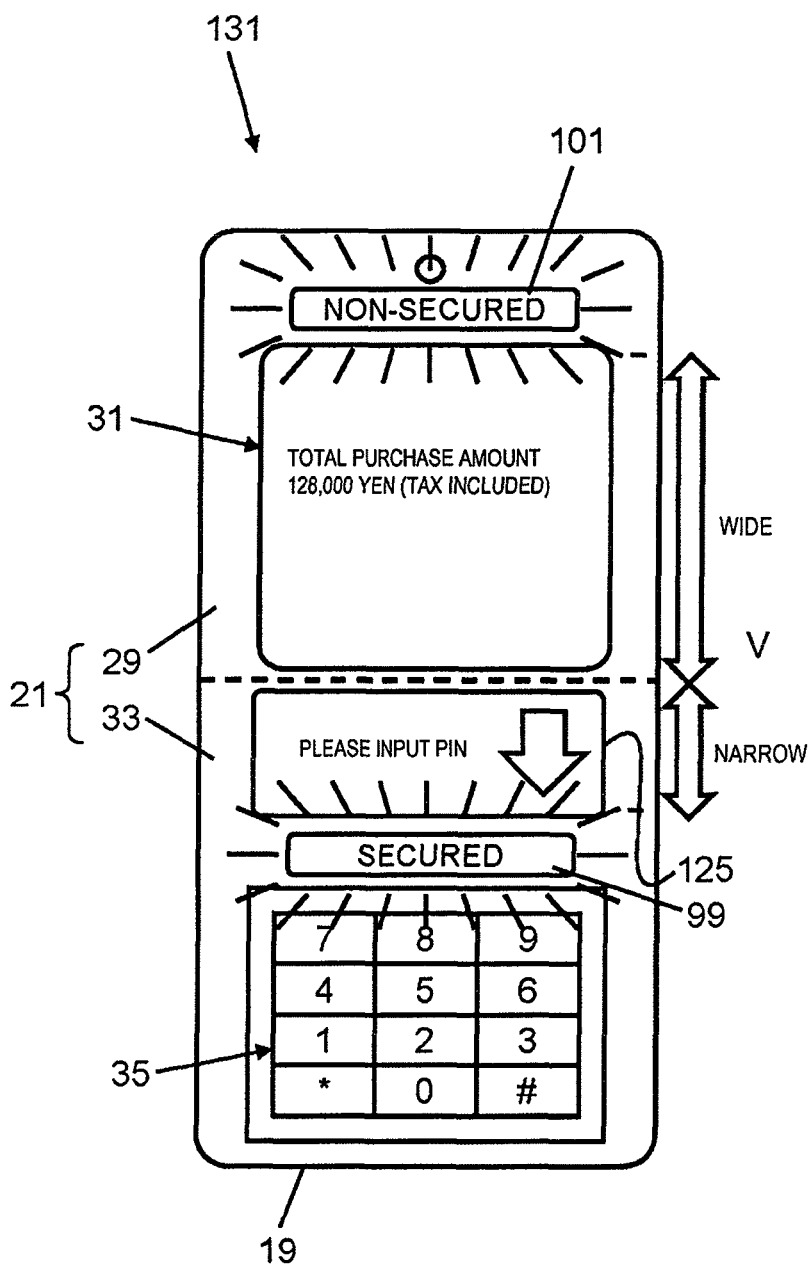
FIG. 11A is a front view of a settlement terminal device according to a modification example of a fourth exemplary embodiment in which a secure LED and a non-secure LED are provided.
Figure 11B:
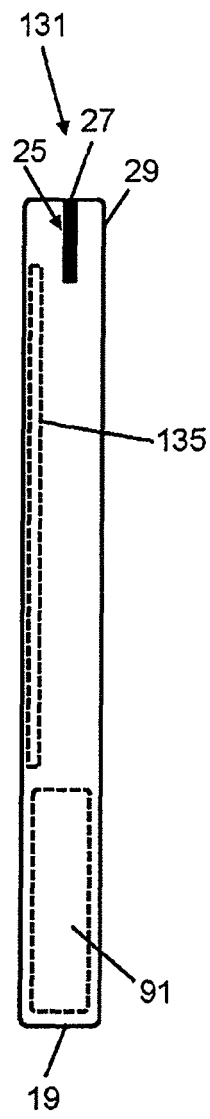
FIG. 11B is a side view of the settlement terminal device shown in FIG. 11A.

FIG. 11A is a front view of settlement terminal device 131 of a modification example of the fourth exemplary embodiment in which secure LED 99 and non-secure display LED 101 are provided. FIG. 11B is a side view of settlement terminal device 131 shown in FIG. 11A. Settlement terminal device 131 of the modification example includes secure LED (secure state display section) 99 and non-secure LED (secure state display section) 101, in addition to third touch panel 125.

According to settlement terminal device 131, second touch panel 35 and secure LED 99 are provided at such positions as to be adjacently arranged on the front side. Since second touch panel 35 and secure LED 99 are disposed to be spaced from first touch panel 31 and non-secure LED 101, an operator can easily recognize that second touch panel 35 is an input area where security is guaranteed, and can safely input the authentication information. That is, it is possible to clearly distinguish between secure and non-secure.

Further, the background color of the display in third touch panel 125 may be different from the background color of the display in first touch panel 31. The background color of the display in secure dedicated second touch panel 35 may be different from the background color of the display in first touch panel 31. Further, the background color of the display in third touch panel 125 and the background color of the display in secure dedicated second touch panel 35 may be the same color or may be similar colors. The color (and surface treatment) of the housing of settlement terminal device 123 may be changed using a broken line between first touch panel 31 and third touch panel 125 as a boundary. A groove or a linear protrusion indicating the boundary may be provided in the housing corresponding to a portion of the broken line between first touch panel 31 and third touch panel 125. Thus, it is possible to notify an operator that second touch panel 35 and third touch panel 125 are areas where security of display or input of authentication information (PIN or the like) is guaranteed.

The settlement terminal device which is an information processing device relating to the disclosure has the following specific configurations, in addition to the configurations described in the above-described exemplary embodiments. That is, the settlement terminal device includes a read/write controller of non-contact type IC card reader/writer 133 in second information processing unit 17 which is a secure side.

According to the settlement terminal device in which the read/write controller of non-contact type IC card reader/writer 133 (see FIG. 3) is provided in the secure side, it is possible to secure information security.

Further, the settlement terminal device includes loop antenna 135 of non-contact type IC card reader/writer 133 in first information processing unit 15 which is a non-secure side.

According to the settlement terminal device in which loop antenna 135 of non-contact type IC card reader/writer 133 is provided in first information processing unit 15, it is possible to secure a wide area where first touch panel 31 is overlapped.

The settlement terminal device may make colors of the surface of the housing of the secure input/output section and the surface of the housing of the non-secure input/output section different.

According to the settlement terminal device in which the colors of the surface of the housing of the secure input/output section and the surface of the housing of the non-secure input/output section are made different, a user's mistake does not easily occur, and thus, secured authentication processing, settlement processing, or the like can be safely performed.

Further, the settlement terminal device may make the background color of secure display area 103 and the background color of non-secure display area 105 different.

According to the settlement terminal device in which the background color of secure display area 103 and the background color of non-secure display area 105 are made different, a mistake does not easily occur, and thus, secured authentication processing, settlement processing, or the like can be safely performed.

Accordingly, according to the information processing device according to the above-described embodiments, even when a secure portion and a non-secure portion are present together, it is possible to secure security of authentication information, and prevent occurrence of an operator's mistake or an incorrect operation.

Hereinbefore, various embodiments are described with reference to the accompanying drawings, but the disclosure is not limited thereto. It is obvious to those skilled in the art that various modifications or revisions can be made within the categories disclosed in claims, which should be construed to be included in the technical scope of the disclosure.

What is claimed is:

1. An information processing device, comprising:
a non-secure information processor that is accommodated in a housing;
a first input display that is provided on an operational surface of the housing;
a secure information processor that is accommodated in the housing;
a second input display that is provided on the operational surface; and
a boundary that is between a first end side of the housing and a second end side of the housing, the second end side of the housing being opposite to the first end side of the housing across the first input display and the second input display,
wherein a color or a surface treatment of a first portion of the first end side of the housing corresponding to the non-secure information processor is distinguishable from a color or a surface treatment of a second portion of the second end side of the housing corresponding to the secure information processor.

2. The information processing device of claim 1,
wherein a magnetic card reader that reads information on a magnetic card is disposed on the housing with the first input display interposed between the second input display and the magnetic card reader.

3. The information processing device of claim 1,
wherein the information processing device is a portable settlement terminal device,
the first input display displays an amount relating to settlement, and
authentication information on a card used in the settlement is input to the second input display.

4. The information processing device of claim 1,
wherein a background color of the first input display is distinguishable from a background color of the second input display.

5. An information processing device, comprising:
a non-secure information processor that is accommodated in a housing;
a first input display that is provided on an operational surface of the housing;
a secure information processor that is accommodated in the housing;
a second input display that is provided on the operational surface; and
a boundary that is between one end side of the housing and an opposite end side of the housing to the one end side of the housing across the first input display and the second input display,
wherein a color or a surface treatment of a first portion of the one end side of the housing corresponding to the non-secure information processor is distinguishable from a color or a surface treatment of a second portion of the opposite end side of the housing corresponding to the secure information processor.

6. The information processing device of claim 5,
wherein a magnetic card reader that reads information on a magnetic card is disposed on the housing with the first input display interposed between the second input display and the magnetic card reader.

7. The information processing device of claim 5,
wherein the information processing device is a portable settlement terminal device,
the first input display displays an amount relating to settlement, and
authentication information on a card used in the settlement is input to the second input display.

8. The information processing device of claim 5,
wherein a background color of the first input display is distinguishable from a background color of the second input display.

9. The information processing device of claim 5,
wherein the boundary is disposed between the first input display and the second input display.

10. The information processing device of claim 5,
wherein the boundary is extended over the first input display.

11. The information processing device of claim 10,
wherein a first area, of the first input display, disposed on the one end side of the housing from the extended boundary is larger than a second area, of the first input display, disposed on an opposite side of the housing from the extended boundary.

* * * * *